March 9, 1937.  S. A. LIMPERT  2,073,450
VIBRATION DAMPING MOUNTING FOR COMPRESSORS, ETC
Filed Feb. 10, 1933
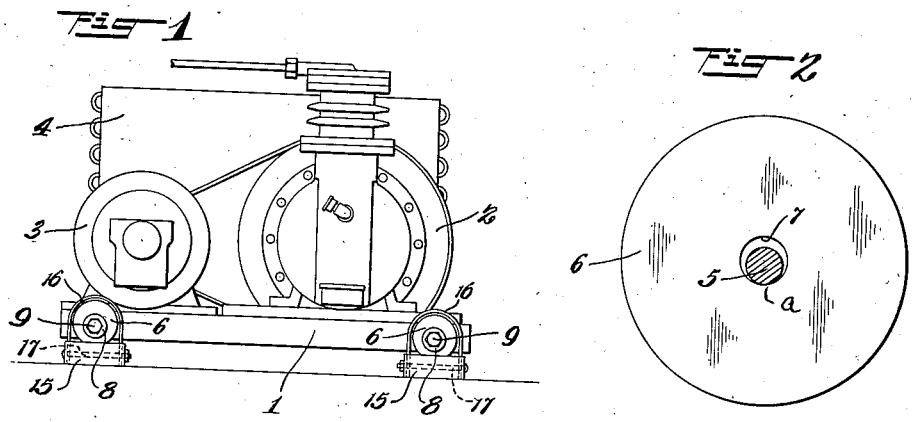
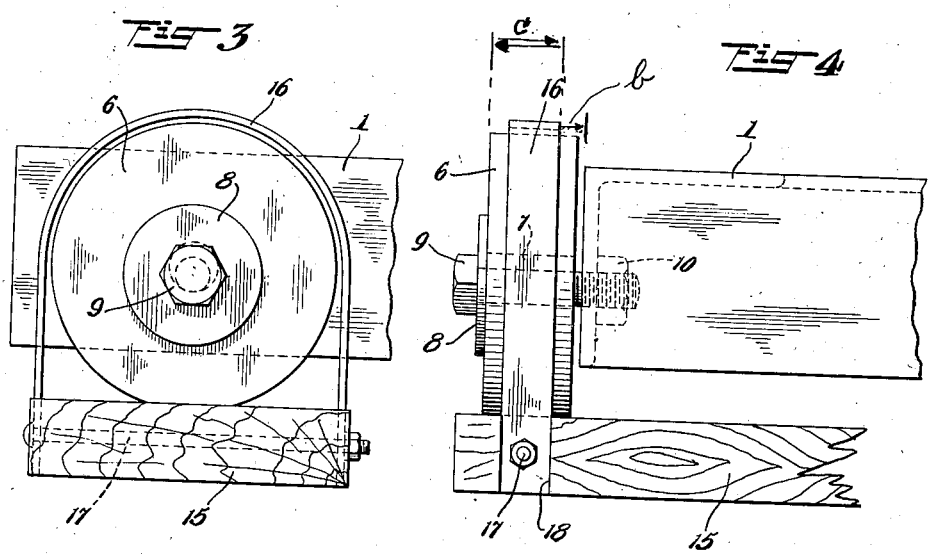
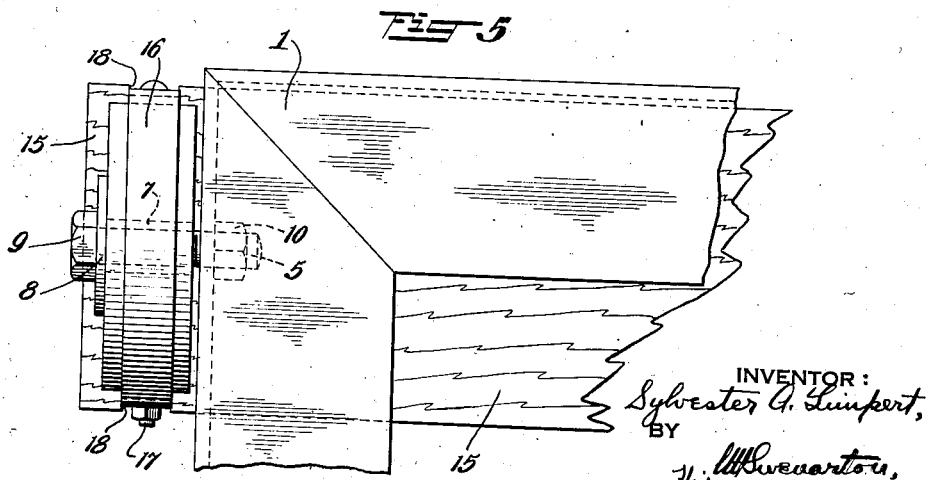
INVENTOR:
Sylvester A. Limpert,
BY
His ATTORNEY.

Patented Mar. 9, 1937

2,073,450

UNITED STATES PATENT OFFICE 2,073,450

VIBRATION DAMPING MOUNTING FOR COMPRESSORS, ETC.

Sylvester A. Limpert, Bay Shore, N. Y., assignor to Mechana Kold Corporation, Bay Shore, N. Y., a corporation of New York Application February 10, 1933, Serial No. 656,090

4 Claims. (Cl. 248—22)

This invention relates to resilient or vibration damping mountings for machines and has for its object the provision of better mountings of this sort. Another object is to provide such a mounting which shall have less work to do in absorbing objectionable vibrations. A further object is to provide a simple and inexpensive device of this character which is efficient and adapted for supporting refrigerator units, including a motor and pump.

A variety of types of resilient mountings for motors, engines, pumps and the like have been suggested, some use coil springs, others rubber pads, leaf springs or air cushions. In all such constructions the cushioning or resilient member is generally so connected to the supported machine that it must absorb all vibrations and vibrations in all directions, up and down, as well as horizontally. An objection to these constructions has been discovered and is thought to be due to the fact that all vibrations cannot be satisfactorily absorbed by any of the same.

According to this invention, the foregoing objection is eliminated by a construction which is adapted to keep the horizontal vibrations more nearly separate and independent of the vertical vibrations, so that there is little danger of a vectorial sum becoming objectionably large. In action, the resilient material of the mounting is called upon to do less work.

Specifically, this mounting contemplates resilient rollers arranged between abutments, so that normally a substantial portion of any horizontal vibration may be absorbed by the inertia in rotating and reversing the rollers within narrow limits without touching the abutments. Any larger horizontal vibrations become damped to a greater extent by the resilient material of the rollers when such horizontal vibrations are large enough to cause the rollers to impinge on each of the opposite abutments. When the horizontal vibrations are stronger in one direction than in another and the rollers contact with an abutment only on one side, the reactive force of their contact tends to equalize the vibrations and center the rollers so they thus become self-centering. Any downward vibrations are absorbed substantially entirely by the resilient material of the rollers. These rollers are of vulcanized rubber or other appropriate material, being loosely mounted on their axles to reduce friction.

Referring to the drawing

Figure 1 shows a preferred embodiment of this invention applied to a refrigerator unit;

Fig. 2 is a detail showing one of the resilient rollers;

Fig. 3 is a detail showing the roller in its operative position;

Fig. 4 is a right, side view of the device of Fig. 3 and

Fig. 5 is a top plan view of the device of Fig. 3.

In Fig. 1 is shown a base plate or platform 1 on which is mounted some of the elements of a mechanical refrigerator, including a vertical reciprocating compressor 2, belt connected to the electric motor 3 and combined with the usual piping, not shown, for a condenser 4. In the embodiment illustrated, a platform 1 is provided with an angle iron frame, the downwardly projecting flange of which is threaded to receive the bolts 5. Loosely mounted on these bolts or axles 5 are centrally apertured discs of vulcanized rubber circular in shape. The central aperture 7 of each of said discs is substantially larger than the bolt 5, in order that the disc may rotate with the minimum of friction. These disc rollers 6 are held in place by a metal washer 8, substantially larger than the central aperture 7 and held in place by the bolt head 9. A lock nut 10 is provided on the other end of the bolt 5 and if desired, of course, a lock washer may be placed between the nut 10 and the flange of the platform.

Beneath each opposite pair of rollers is a wooden or steel crosspiece 15. A metal strap 16 is secured to the crosspiece at each end thereof by bolts 17, the metal straps 16 being countersunk in grooves 18 below the side edges or surfaces of the wooden crosspieces. As illustrated, the metal straps 16 are arched over the rollers and normally spaced therefrom.

The vertical vibrations, due to the compression stroke of the vertical reciprocating pump 2, are substantially entirely absorbed by the rubber rollers 6. Any horizontal vibrations due to slackness in the belt or other causes, are, for small vibrations only partially absorbed by the resilient material of the roller 6, the larger portion of such small vibrations being absorbed by slight or limited oscillations of the rollers 6 without touching the straps or abutments 16. The spacing between the abutments 16 and the rollers allows very limited rolling action of the discs in order to absorb the major portion of such vibrations by the inertia of the parts. If any horizontal vibrations should be of larger magnitude, the rollers 6 contact with the abutments 16, with the result that a much larger portion of such horizontal vibrations become absorbed by the resilient material contacting with the abutments, than is the case when horizontal vibrations are small enough not to cause the rollers to contact with the abutments. Due to the weight of the platform, the rollers will be only slightly deformed, as shown in Fig. 3, from which it will be apparent that some portion of the horizontal vibrations is necessarily always absorbed by the resilient material, but because such portion of small horizontal vibrations is relatively small compared to the much larger portion of larger horizontal vibrations that is absorbed by the resilient material, it may be considered that for small horizontal vibrations, rotation of the rollers may be relatively free between the abutments.

Among the advantages of this invention may be mentioned the self-centering characteristic of the rollers, whereby after impingement upon an abutment, they tend to become centered between the abutments, as shown in Fig. 3. The clearance between the axle 5 and the disc perforation contributes a minimum of friction and absorption of a larger part of the horizontal vibrations by the limited roll, rather than by a resilient material. In the embodiment illustrated, there should be substantially little or no horizontal vibrations which are parallel to the axle 5, because the belt looseness will cause the larger portion of any larger vibrations and such horizontal vibrations are almost entirely parallel to the plane of the belt. However, any horizontal vibrations parallel to the axles will be absorbed by the friction of the axle sliding through the rollers between the washer 8, as one abutment, and the down flange of the platform, as the other abutment. The vertical vibrations, due to the compression of the pump, are substantially entirely absorbed by the resilient material of the rollers between the crosspieces 15 and the axles 5.

It will therefore be apparent that by the foregoing construction, horizontal and vertical vibrations are kept more nearly separate, especially when the horizontal vibrations are small and not large enough to cause continual contact of the rollers with the abutments. Such independence of the small horizontal vibrations is preferred because there is then little or no danger of any vectorial component of the two becoming objectionably large.

The crosspieces 15, with the abutment straps 16, are preferably attached in the position illustrated, at the factory and when so constructed, the apparatus is more conveniently transported, ready for use, than if these abutment straps were assembled in position later. From Fig. 4 it will be appreciated that there is no likelihood for the straps 16 to come off because any thrust longitudinally of the wooden crosspieces or beams 15 in either direction causes the straps to engage the edge of the platform. It will be a simple matter when placing the unit within a refrigerator for its final location to see that the straps 16 are spaced from the platform edges. The wooden pieces 15 co-operate with the rollers 6 to provide quiet operation. If desired, the rollers 6 may be mounted in slight undercut grooves on the top ends of the crosspieces 15, but such is not believed necessary.

It is expected that under normal operating conditions the horizontal vibrations, imparted principally by the compressor driving belt, are not sufficient to cause continual impingement of the rollers against their abutments, and these so-called normal horizontal vibrations are taken up in part by the resiliency of the rollers and in part by the inertia of the almost imperceptible, limited rotation of the rollers and only exceptionally large horizontal vibrations are taken up by the rollers impinging upon the abutments on opposite sides. Therefore, it is only in the unusual and unexpected circumstances wherein large horizontal vibrations are present, that the resilient mountings of this invention approach in similarity and function to the fixed and non-rotative resilient mountings of the prior art. Furthermore, the extremely small contact surface $a$ between each axle and its corresponding damping roller permits only of the transmission of but a minimum amount of the aforesaid normal vibrations to the roller as such, contrary to what would be the case were the periphery of such axle in continuous engagement with the inner periphery of the aperture in the damping roller.

As shown in Figs. 4 and 5, the spacing between the inner edge of each shroud or strap 16 and the adjacent side of the base or platform 1, as designated by the letter $b$, is preferably substantially less than the spacing or distance $c$ from such inner edge of the shroud and the outer edge of the roller 6 mounted within such shroud and consequently it is impossible for the roller 6 to become dislodged from its enveloping shroud during shipment, since the outward movement of the roller is limited by the engagement of the inner edge of its shroud with the adjacent face of the base 1 and in turn correspondingly restricts the inward movement of the roller on the opposite side of the base 1 with respect to its shroud and thereby the escape of the opposing rollers on either side of the base from the confines of the enveloping shrouds is at all times prevented, even when the whole mounting or a cabinet containing the same is inverted.

One of the important advantages of my improved mounting resides in the fact that it peculiarly lends itself to facilitating the shipment of cabinets, such as that containing an electric refrigerating unit, for example, since when the cross-pieces 15 are secured by bolts to the frame of the cabinet, no packing cleats or special bolts or blocks whatsoever are required to brace the refrigerating unit during shipment and consequently, upon delivery, all labor of loosening and removing added bracing elements is eliminated, it being merely necessary to effect the centering of the discs within their respective shrouds by manually adjusting the unit with respect to the respective cross-pieces so that the discs are just clear of such shrouds as illustrated in Fig. 3. In other words, the shrouds serve to practically lock the unit assembly in place on the supporting cross-pieces during shipment, while still permitting of a certain amount of flexibility therebetween notwithstanding the fact that the cross-pieces themselves are, as above stated, rigidly secured to the cabinet frame.

Various modifications within the scope of the appended claims may be made without departing from the spirit of my invention.

Having thus described my invention, what I claim and desire to obtain by United States Letters Patent is:—

1. In a resilient mounting for a machine subject to vibrations, the combination with a supporting axle, of a resilient roller loosely mounted thereon, and abutment means for co-operation with the roller periphery to limit lateral movement thereof, there being a substantial clearance between said roller and said abutment means, whereby the vibrations may tend to center the roller between said abutment means.

2. In a resilient mounting for a machine subject to vibrations, the combination with a supporting axle, of a resilient roller loosely mounted thereon, abutment means for co-operation with the roller periphery to limit lateral movement thereof, there being a substantial clearance between said roller and said abutment means, whereby the vibrations may tend to center the roller between said abutment means, and a member beneath and on which said roller rests, said abutment means comprising a metal band secured to the roller supporting member and arched over the roller.

3. In a resilient mounting for a machine subject to vibrations, the combination of a base adapted to support a vibratory mechanism, resilient supports respectively mounted on opposite sides of said base, shroud members respectively encasing said supports and normally slightly spaced therefrom and from the said base, the spacing between the inner edges of said shroud members and the adjacent faces of the said base being substantially less than the distance from the inner edge of the shroud member to the most remote face of a resilient support enveloped thereby, whereby accidental dislodgment of a resilient support from its shroud during shipment is prevented.

4. In a resilient mounting for a machine subject to vibrations, the combination of a base adapted to support a vibratory mechanism, a plurality of cylindrical axles projecting laterally from said base, a resilient roller loosely mounted on each of said axles, the portion of each axle which is in engagement with each roller constituting but a relatively small arc, and but a minor portion of the complete periphery of such axle, a shroud member extending over the top of each roller and normally out of contact therewith, said shroud serving as a lateral abutment to limit the rolling movement of the enshrouded roller in each direction, and shroud-carrying means extending beneath each roller and in contact therewith, said mounting serving to damp vibrations in the direction of gravity through resiliency and vibrations normal to the direction of gravity through rotation of such rollers.

SYLVESTER A. LIMPERT.